March 31, 1925.
C. S. BROWN
1,531,686
AGRICULTURAL MACHINE
Filed July 23, 1919
3 Sheets-Sheet 1
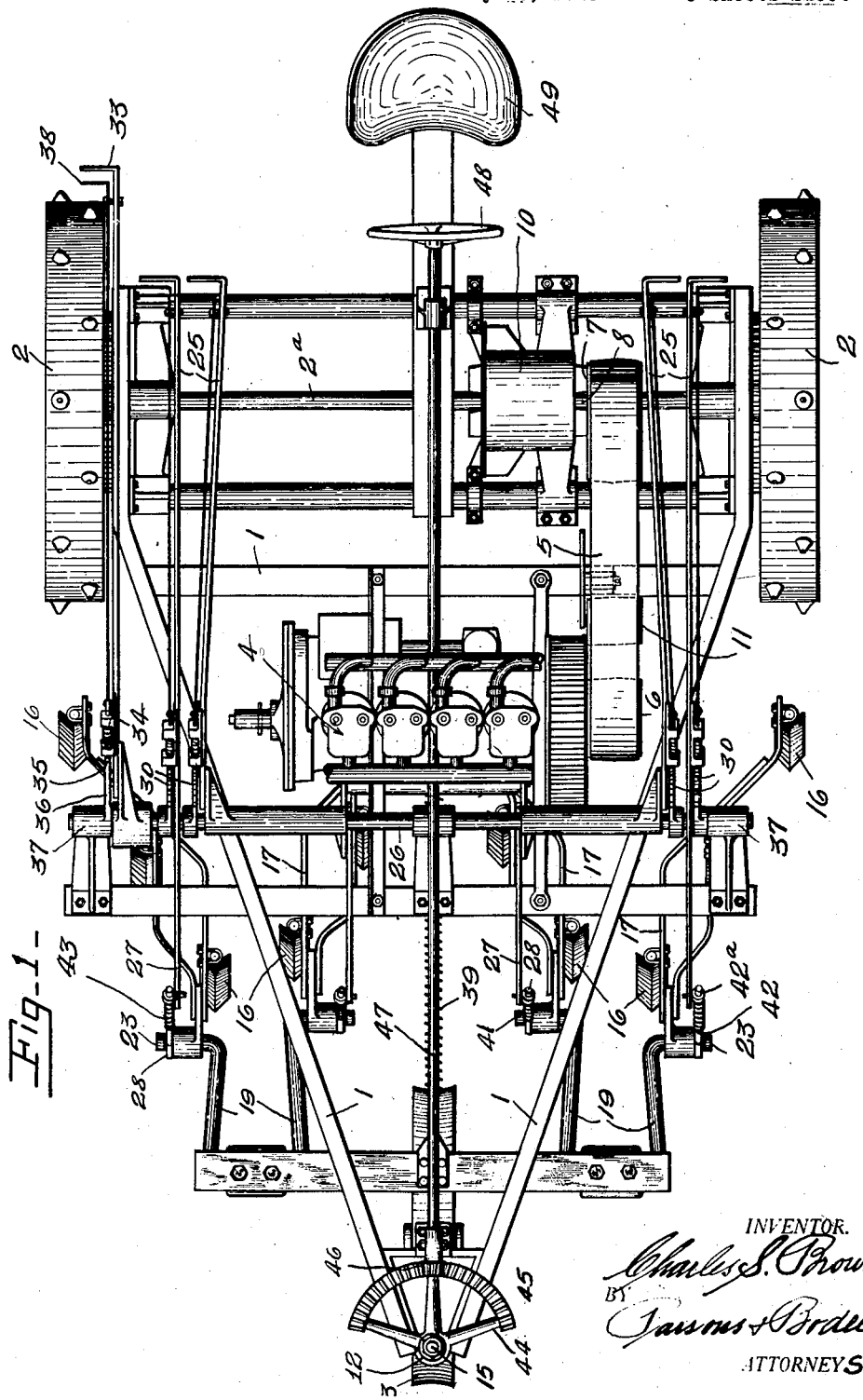
Fig-1-
INVENTOR.
Charles S. Brown
BY
Jasmus & Birdell
ATTORNEYS.

March 31, 1925.
C. S. BROWN
AGRICULTURAL MACHINE
Filed July 23, 1919
1,531,686
3 Sheets-Sheet 2
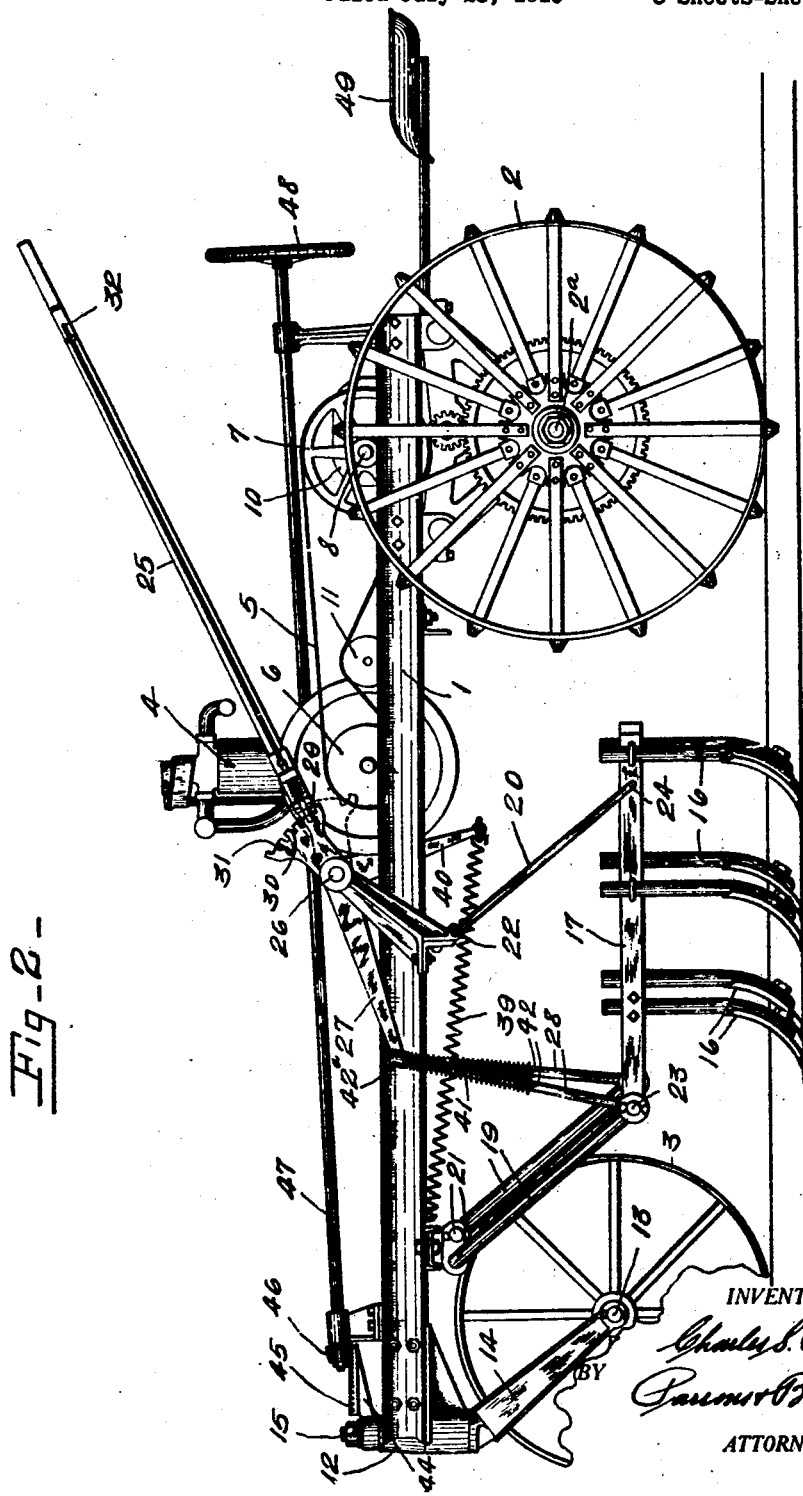
Fig-2-
INVENTOR.
Charles S. Brown
BY
ATTORNEYS.

March 31, 1925.
C. S. BROWN
1,531,686
AGRICULTURAL MACHINE
Filed July 23, 1919 3 Sheets-Sheet 3
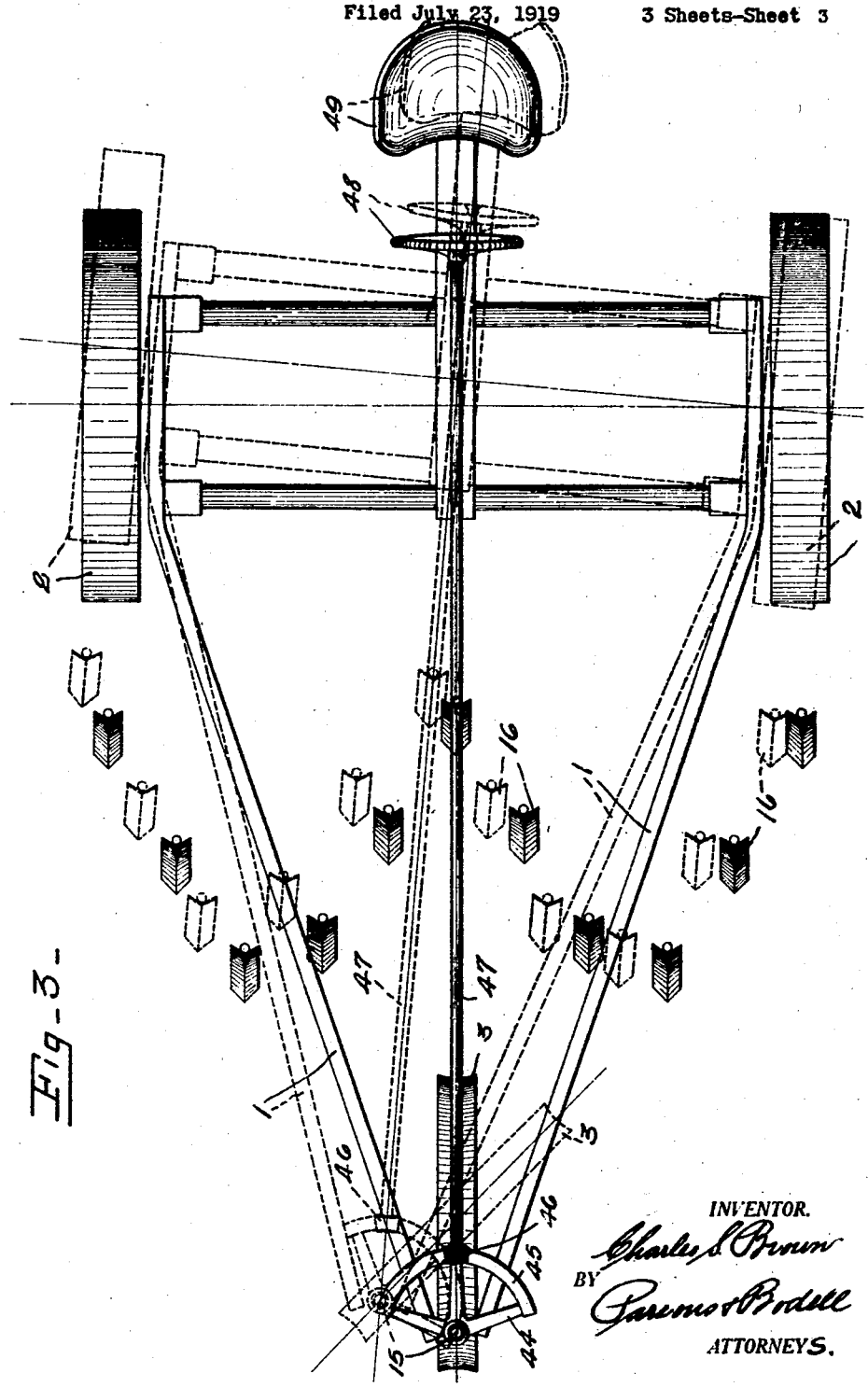
Fig-3-
INVENTOR.
Charles S. Brown
BY
Parmer & Bodell
ATTORNEYS.

Patented Mar. 31, 1925.

1,531,686

UNITED STATES PATENT OFFICE.

CHARLES S. BROWN, OF SYRACUSE, NEW YORK.

AGRICULTURAL MACHINE.

Application filed July 23, 1919. Serial No. 312,779.

*To all whom it may concern:*

Be it known that I, CHARLES S. BROWN, a citizen of the United States, and a resident of Syracuse, in the county of Onondaga and State of New York, have invented a certain new and useful Agricultural Machine, of which the following is a specification.

This invention relates to agricultural machines and has for its object a cultivator having particularly simple and efficient means for guiding the machine and shifting the implements carried thereby so that the implements will follow the rows of plants being cultivated; and the invention consists in the novel features and in the combinations and constructions hereinafter set forth and claimed.

In describing this invention, reference is had to the accompanying drawings in which like characters designate corresponding parts in all the views.

Figure 1 is a plan view of a cultivator embodying my invention.

Figure 2 is a side elevation thereof.

Figure 3 is a plan view, parts being omitted, the position of the implements or cultivators and the frame, when the frame is shifted laterally during the turning of the steering wheel into an angular position, being shown in dotted lines.

This agricultural machine or cultivator comprises generally, a main frame, ground and steering wheels supporting the frame, implements carried by the frame, and means for shifting the implements laterally relatively to the point of contact of the steering wheel with the ground so as to follow the rows of plants.

The numeral 1 designates the main frame which may be of any suitable form, size and construction, it being here shown as triangular in general form.

The numeral 2 designates the ground wheels supporting the rear end of the frame 1, and 3 is the steering wheel at the front end of the frame, the wheels 2 being mounted on the opposite ends of an axle 2ª.

I have here shown the cultivator as driven by a motor 4 mounted on the frame and connected to the wheels 2 by suitable power transmitting mechanism including the belt 5 running over pulleys 6 and 7, the former being mounted upon the crank shaft of the engine and the latter upon a shaft 8, and gearing between the shaft 8 and the wheels 2 which serve as tractor wheels. The greater portion of this gearing is contained in the casing 10.

The power transmitting mechanism may be of any suitable form, size and construction and forms no part of this invention.

The part designated 11 is an idler coacting with the belt 5 and also operable at will to tighten or loosen the belt and hence serve as a clutch for operatively connecting the pulley 6 to the pulley 7.

The frame 1 is provided with an upright bearing 12 at its front end and the front wheel is mounted on an axle 13 mounted in a fork 14, having a spindle 15 in the bearing 12, the axle 13 being located out of the axial line of the spindle 15 and as here shown it is located in the rear of said axial line, the fork being inclined rearwardly out of the vertical line of the bearing 12 so that the turning axis of the steering wheel is located in a vertical line in the rear of the axis of the spindle 15 and passing through the point of contact of the wheel and the ground.

The part designated 16 are the implements such as cultivator shovels carried by frames 17 suitably supported from the main frame 1, and as here shown they are carried by links 19 and 20 pivoted at their upper ends at 21 and 22 respectively to the main frame and at their lower ends at 23 and 24 respectively to the implement frames 17.

As here shown, there are four frames and these frames may be raised and lowered to position them individually by suitable means as levers 25 mounted on a shaft 26 on the main frame, each lever 25 having a forwardly extending arm 27 connected at its front end to a link 28 which link is pivoted at its lower end to the implement frame 17.

Each lever 25 is loosely mounted on the shaft 26 and has a spring pressed pawl 29 associated therewith which coacts with a rack 30 formed on a bracket 31 mounted on and rockable with the shaft 26. Each pawl is actuated by a grip lever 32 carried by its companion lever 25.

The frames 17 are raised and lowered collectively by rocking the shaft 26 when all the levers 25 are locked thereto by the pawls 29 and racks 30. Said shaft is operated by a lever 33 mounted thereon and having a pawl 34 coacting with a rack 35 formed on a bracket 36 fixed to one of the bearings 37 for the shaft 26, said pawl being operated by a grip lever 38 associated with the lever 33. A counterbalancing spring 39 is connected at one end to the main frame and at its other end to an arm 40 mounted on the shaft 26 to rock therewith.

Also floating movement of the frames 17 is permitted by springs 41, here shown as encircling the links 28 and interposed between pins of shoulders 42 on said links and the bearings 42ª at the front ends of the arms 27 of the lever 25 in which bearing the links may slide endwisely during compression and extension of the springs 41.

To raise or lower the frames 17 collectively the shaft 26 is rocked by operating the lever 33 when the levers 25 are locked to the shaft by the pawls 29 and racks 30. To elevate or lower more or less any frame 17 individually the companion levers 25 are operated after first withdrawing the pawl 29 from its rack 30.

During depression of any one of the levers 25 from its position shown in Fig. 2, the link 28 is pulled upwardly causing the corresponding frame 17 to swing rearwardly and upwardly, the frame being guided in its movement by the links 19 and 20 which are preferably arranged parallel to each other so that the implement frame 17 is carried horizontally toward and from the ground.

The means for shifting the frame 1 and implement frames 17 laterally during the turning of the steering wheel into different angular positions about its upright turning axis passing vertically through the axle 13 of the steering wheel with the ground, comprises a rearwardly extending bracket 44 mounted on the spindle 15 having an arc shaped toothed rack 45 with which meshes a gear 46 on the front end of a steering rod 47, the rod extending rearwardly and having a hand wheel 48 at its rear end located within reach of the driver on the seat 49.

The rows of plants as corn, potatoes, etc., are not always straight as will be readily understood, but some portions thereof curve or are deflected out of straight lines although the rows are always parallel if planted by a parallel mechanical planter.

In the use of my machine, when the machine reaches the points in the rows where they are deflected out of straight lines, the steering rod 47 is operated and the frame 1 instantly shifted laterally in one direction or the other to cause the implements or cultivators to shift their position laterally in order to follow the rows instantly and not be delayed until the machine obeys the steering wheel. Oftentimes before the machine does obey the steering wheel, the steering rod 47 is operated to shift the frame and hence the implements back into their original position. During the operation of the steering rod, the steering wheel fulcrums at the point of engagement of the steering wheel with the ground and moves the spindle 15 of the fork and front end of the frame laterally relatively to the point of contact of the steering wheel on the ground while the turning angle of the steering wheel is changing.

What I claim is:

1. In an agricultural machine, the combination of a frame, a rear axle, ground wheels mounted on opposite ends of the axle, and a front steering wheel, the frame being provided with a vertical bearing at its front end and a steering wheel having a fork provided with a spindle journaled in the bearing, the fork carrying the axle for the steering wheel out of line with the axial line of the spindle, means for shifting the bearing and the frame laterally relatively to the steering wheel about an upright axis extending through the point of contact of the steering wheel and the ground and turning the steering wheel about said axis, and implements carried by the frame and shiftable laterally therewith, substantially as and for the purpose described.

2. In an agricultural machine, the combination of a frame, ground and steering wheels supporting one end of the frame, the frame being provided with an axle rigid with the frame and rigid spindles on which the ground wheels are mounted, the frame being also formed with an upright bearing at its other end, a fork in which the steering wheel is mounted provided with a spindle journaled in the upright bearing, the fork carrying the axle for the steering wheel at its lower end out of the axial line of the bearing, means for turning the steering wheel about an upright axis passing through the point of engagement of the steering wheel and the ground and thereby shifting the one end of the frame laterally and implements carried by the frame and shiftable laterally therewith, substantially as and for the purpose described.

In testimony whereof, I have hereunto signed my name at Syracuse, in the county of Onondaga, and State of New York, this 31st day of March, 1919.

CHAS. S. BROWN.